United States Patent
Basu et al.

(10) Patent No.: US 10,437,736 B2
(45) Date of Patent: Oct. 8, 2019

(54) SINGLE INSTRUCTION MULTIPLE DATA PAGE TABLE WALK SCHEDULING AT INPUT OUTPUT MEMORY MANAGEMENT UNIT

(71) Applicant: Advanced Micro Devices, Inc., Santa Clara, CA (US)

(72) Inventors: Arkaprava Basu, Austin, TX (US); Eric Van Tassell, San Marcos, TX (US); Mark Oskin, Clinton, WA (US); Guilherme Cox, Highland Park, NJ (US); Gabriel Loh, Bellevue, WA (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 98 days.

(21) Appl. No.: 15/852,442

(22) Filed: Dec. 22, 2017

(65) Prior Publication Data

US 2019/0196978 A1    Jun. 27, 2019

(51) Int. Cl.
   *G06F 12/00*    (2006.01)
   *G06F 12/1009*    (2016.01)
   (Continued)

(52) U.S. Cl.
   CPC ........ *G06F 12/1009* (2013.01); *G06F 9/3887* (2013.01); *G06F 9/4843* (2013.01); *G06F 12/1027* (2013.01); *G06F 13/4022* (2013.01); *G06F 13/4282* (2013.01); *G06F 2212/65* (2013.01); *G06F 2212/68* (2013.01); *G06F 2213/0026* (2013.01)

(58) Field of Classification Search
   CPC ............. G06F 12/1009; G06F 12/1027; G06F 9/3887; G06F 9/4843; G06F 13/4022; G06F 13/4282; G06F 2212/65; G06F 2212/68; G06F 2213/0026
   See application file for complete search history.

(56) References Cited

U.S. PATENT DOCUMENTS

| 4,763,250 | A  |   | 8/1988 | Keshlear et al. |
| 6,728,800 | B1 | * | 4/2004 | Lee ..................... G06F 12/1027 710/44 |

(Continued)

OTHER PUBLICATIONS

Jan Vesely, Arkaprava Basu, Mark Oskin, Gabriel H. Loh, Abhishek Bhattacharjee; "Observations and Opportunities in Architecting Shared Virtual Memory for Heterogeneous Systems"; IEEE International Symposium on Performance Analysis of Systems and Software (ISPASS); Apr. 2016; 11 pages.

(Continued)

*Primary Examiner* — Shawn X Gu
(74) *Attorney, Agent, or Firm* — Polansky & Associates, P.L.L.C.; Paul J. Polansky; Rosalynn M. Smith (57) ABSTRACT

A data processing system includes a memory and an input output memory management unit that is connected to the memory. The input output memory management unit is adapted to receive batches of address translation requests. The input output memory management unit has instructions that identify, from among the batches of address translation requests, a later batch having a lower number of memory access requests than an earlier batch, and selectively schedules access to a page table walker for each address translation request of a batch.

20 Claims, 5 Drawing Sheets

(51) Int. Cl.
*G06F 12/1027* (2016.01)
*G06F 9/38* (2018.01)
*G06F 13/40* (2006.01)
*G06F 9/48* (2006.01)
*G06F 13/42* (2006.01)

(56) References Cited

U.S. PATENT DOCUMENTS

2009/0172316 A1* 7/2009 Teh .................. G06F 12/10
  711/158
2012/0246381 A1 9/2012 Kegel et al.

OTHER PUBLICATIONS

Bharath Pichai, Lisa Hsu, Abhishek Bhattacharjee; "Architectural Support for Address Translation on GPUs"; ASPLOS '14 Proceedings of the 19th international conference on Architectural support for programming languages and operating systems; Apr. 2014; 15 pages.
Niladrish Chatterjee, Mike O'Connor, Gabriel H. Loh, Nuwan Jayasena, Rajeev Balasubramonian; "Managing DRAM Latency Divergence in Irregular GPGPU Applications"; SuperComputing Conference and Expo (SC14); Nov. 2014; 12 pages.
Jason Power, Mark D. Hill, David A. Wood; "Supporting x86-64 Address Translation for 100s of GPU Lanes"; 20th IEEE International Symposium on High Performance Computer Architecture (HPCA'14); Feb. 2014; 12 pages.

* cited by examiner

SINGLE INSTRUCTION MULTIPLE DATA
PAGE TABLE WALK SCHEDULING AT
INPUT OUTPUT MEMORY MANAGEMENT
UNIT

STATEMENT REGARDING FEDERALLY SPONSORED RESEARCH OR DEVELOPMENT

This invention was made with United States government support under the PathForward Project with Lawrence Livermore National Security (Prime Contract No. DE-AC52-07NA27344, Subcontract No. B620717) awarded by the Department of Energy (DOE). The United States government has certain rights in this invention.

BACKGROUND

Shared virtual memory (SVM) across a central processing unit (CPU) and graphical processing unit (GPU) is a feature of accelerated processing units. The input output memory management unit (IOMMU) enables a shared virtual memory of GPUs by servicing the address translation requests of the GPU. The IOMMU accesses the same page table structures utilized by processes running on the CPU. Therefore, the GPU and CPU are able to share the same set of page tables, and thereby the same virtual address space, via the IOMMU.

The GPU executes single instruction multiple data (SIMD) instructions. The IOMMU receives the address translation requests. Each memory access (load/store) request has the potential to issue several concurrent memory requests, up to the length of a wavefront, where the wavefront is a batch of threads that execute in lockstep and together execute SIMD instructions. For example, each work item (or thread) of the wavefront can request an address that belongs to a different OS page. When the translation of the requests is not found in the GPU translation lookaside buffers (TLBs), the translation is forwarded to the IOMMU. The IOMMU performs a translation lookup in its own TLBs, and when it is a miss, a page table walk is required. Thus, with SIMD instructions having many threads that may potentially access different memory pages, timely completion of the instructions is difficult.

In the following description, the use of the same reference numerals in different drawings indicates similar or identical items. Unless otherwise noted, the word "coupled" and its associated verb forms include both direct connection and indirect electrical connection by means known in the art, and unless otherwise noted any description of direct connection implies alternate embodiments using suitable forms of indirect electrical connection as well. Additionally, the terms remap and migrate, and variations thereof, are utilized interchangeably as a descriptive term for relocating.

DETAILED DESCRIPTION OF ILLUSTRATIVE EMBODIMENTS

As will be described below in one form, an input output memory management unit includes a page table scheduler and a plurality of page table walkers. The page table scheduler receives page table walk requests for an address translation for memory accesses. The page table scheduler reorders the page table walk requests such that an order of dispatching the page table walk requests is based on a priority determination. The page table walk requests are requests to translate virtual addresses to physical addresses by accessing an in-memory page table. The page table walk requests are generated in response to execution of single instruction multiple data (SIMD) instruction. The page table walker receives, from the page table scheduler, the page table walk requests and walks page tables associated with each page table walk request in response to the ordering.

In yet another form, a data processing system includes a memory, an input output memory management unit coupled to the memory and adapted to receive batches of address translation requests. The input output memory management unit associates an identifier with each batch of address translation requests that identifies, from among the batches of address translation requests, a later batch having a lower number of memory access requests than an earlier batch; and selectively schedules access to a page table walker for each address translation request of a batch.

In still another form there is described a method for scheduling address translations for a batch, that includes receiving a page table walk request for a batch of address translation requests at a translation lookaside buffer. The batch is a selection of address translation requests generated by execution of a same SIMD instruction. Further, a SIMD instruction identification that is associated with the batch is identified. A total number of memory accesses needed to service the batch is determined. The total number of memory accesses per batch is totaled to formulate a page table lookup count for each batch. In response to the totaling, dispatching a later batch that has a lowest total number of memory accesses per batch.

Figure 1:
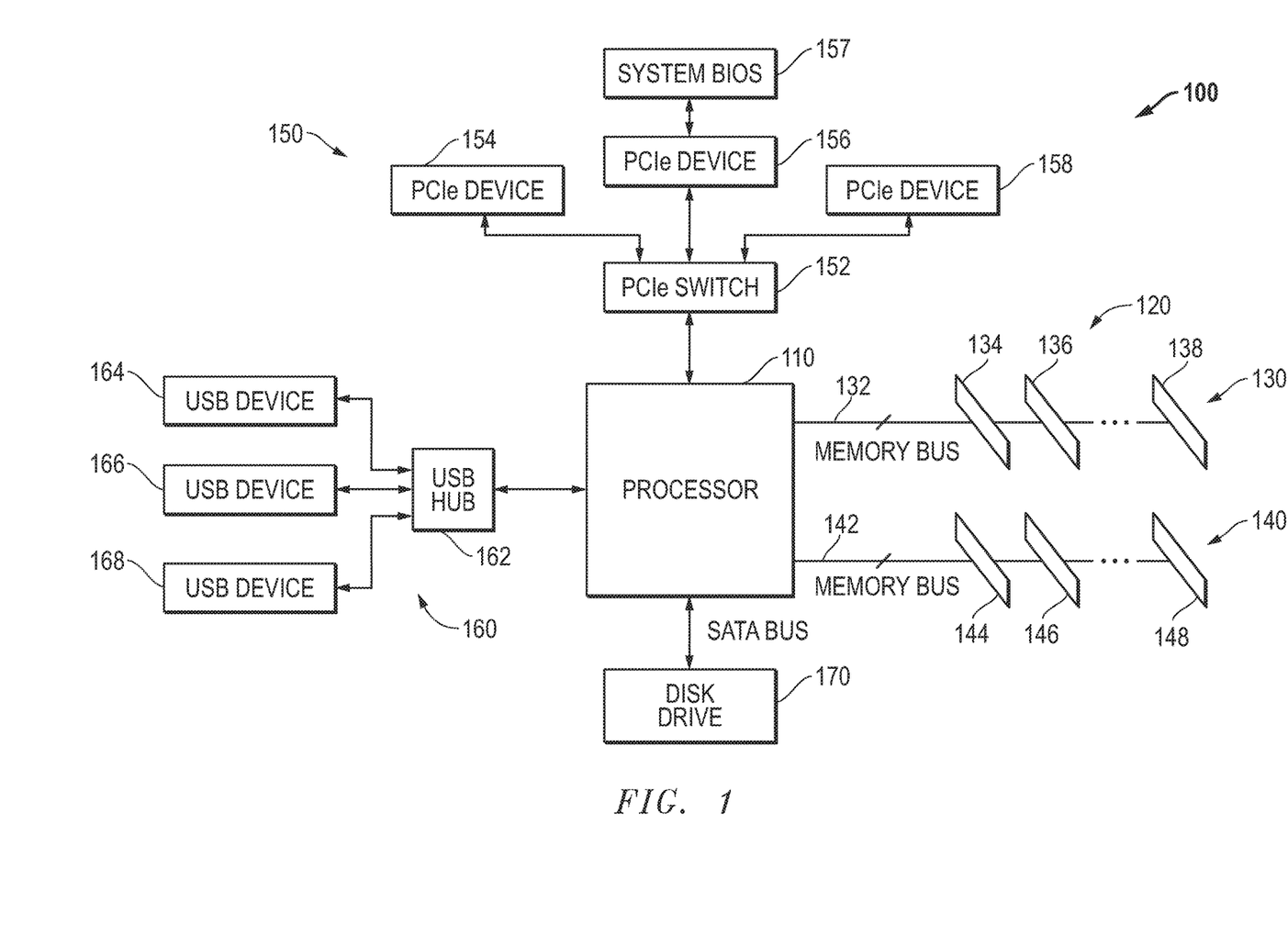
FIG. 1 illustrates in block diagram form a data processing system according to some embodiments.

FIG. 1 illustrates in block diagram form a data processing system 100 according to some embodiments. Data processing system 100 includes generally a data processor 110, a memory system 120, a peripheral component interconnect express (PCIe) system 150, a universal serial bus (USB) system 160, and a disk drive 170. Data processor 110 operates as the central processing unit (CPU) of data processing system 100 and provides various buses and interfaces useful in modern computer systems. These interfaces include two double data rate (DDRx) memory channels, a PCIe root complex for connection to a PCIe link, a USB controller for connection to a USB network, and an interface to a Serial Advanced Technology Attachment (SATA) mass storage device.

Memory system 120 includes a memory channel 130 and a memory channel 140. Memory channel 130 includes a set of dual inline memory modules (DIMMs) connected to a memory bus 132, including representative DIMMs 134, 136, and 138 that in this example correspond to separate ranks.

Likewise, memory channel 140 includes a set of DIMMs connected to a memory bus 142, including representative DIMMs 144, 146, and 148.

PCIe system 150 includes a PCIe switch 152 connected to the PCIe root complex in data processor 110, a PCIe device 154, a PCIe device 156, and a PCIe device 158. PCIe device 156 in turn is connected to a system basic input/output system (BIOS) memory 157. System BIOS memory 157 can be any of a variety of non-volatile memory types, such as read-only memory (ROM), flash electrically erasable programmable ROM (EEPROM), and the like.

USB system 160 includes a USB hub 162 connected to a USB master in data processor 110, and representative USB devices 164, 166, and 168 each connected to USB hub 162. USB devices 164, 166, and 168 could be devices such as a keyboard, a mouse, a flash EEPROM port, and the like.

Disk drive 170 is connected to data processor 110 over a SATA bus and provides mass storage for the operating system, application programs, application files, and the like.

Data processing system 100 is suitable for use in modern computing applications by providing memory channel 130 and memory channel 140. Each of memory channels 130 and 140 can connect to DDR memories such as DDR version 4 (DDR4), low power DDR4 (LPDDR4), graphics DDR version five (gDDR5), and high bandwidth memory (HBM), and can be adapted for future memory technologies. These memories provide high bus bandwidth and high-speed operation.

Figure 2:
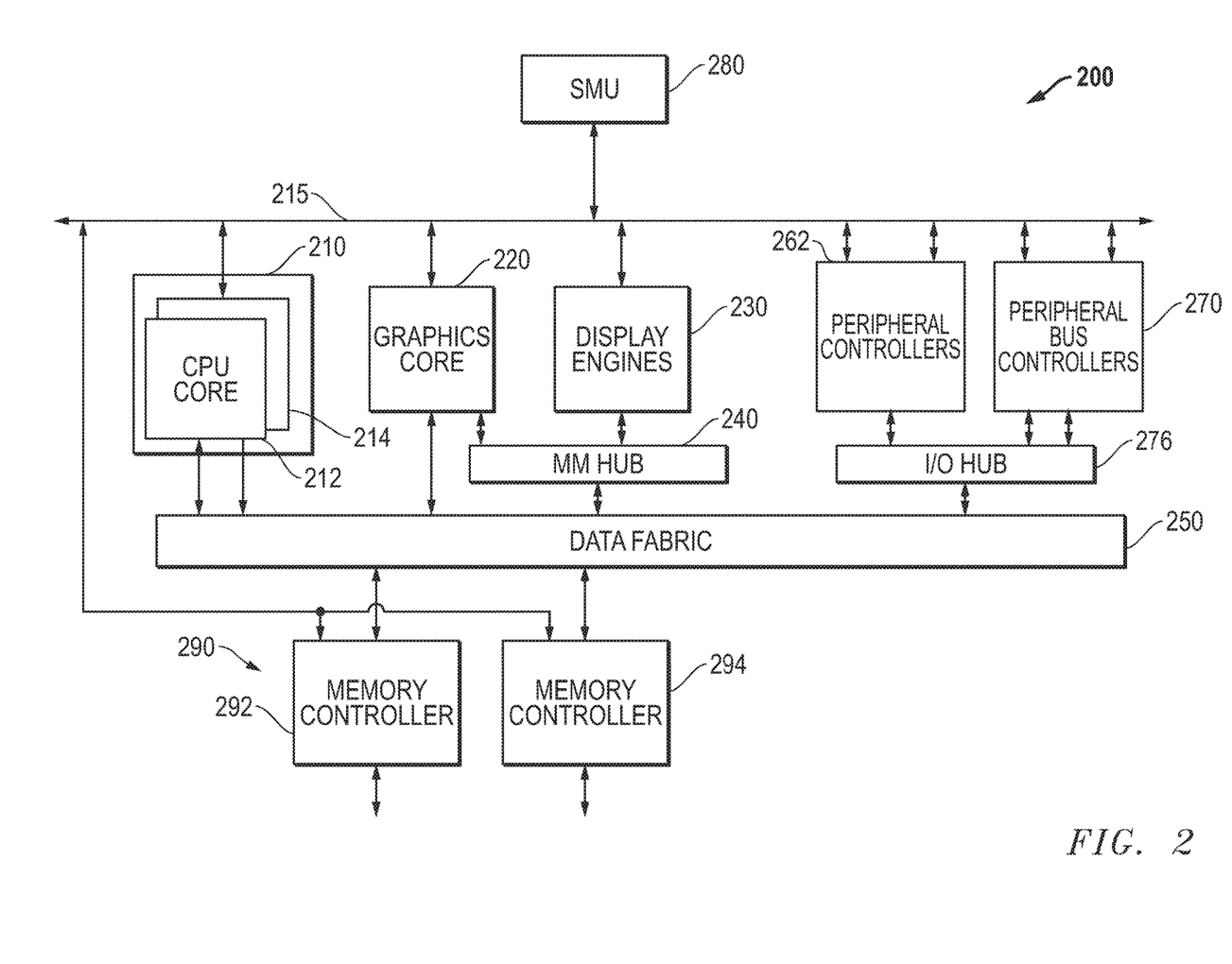
FIG. 2 illustrates in block diagram form a processing unit suitable for use in the data processing system of FIG. 1.

FIG. 2 illustrates in block diagram form a data processor 200 suitable for use in data processing system 100 of FIG. 1. Data processor 200 includes generally a central processing unit (CPU) core complex 210, a graphics core 220, a set of display engines 230, an input output memory management unit (IOMMU) 240, a data fabric 250, a set of peripheral controllers 262, a set of peripheral bus controllers 270, an input output hub 276, a system management unit (SMU) 280, and a set of memory controllers 290 (memory controller 292 and 294).

CPU core complex 210 includes a CPU core 212 and a CPU core 214. In this example, CPU core complex 210 includes two CPU cores, but in other embodiments CPU core complex can include an arbitrary number of CPU cores. Each of CPU cores 212 and 214 is bi-directionally connected to a system management network (SMN) 215, which forms a control fabric, and to data fabric 250, and is capable of providing memory access requests to data fabric 250. Each of CPU cores 212 and 214 may be unitary cores, or may further be a core complex with two or more unitary cores sharing certain resources such as caches.

Graphics core 220 is a high-performance graphics processing unit (GPU) capable of performing graphics operations such as vertex processing, fragment processing, shading, texture blending, and the like in a highly integrated and parallel fashion. Graphics core 220 is bidirectionally connected to SMN 215 and to IOMMU 240, and is capable of providing memory access requests to data fabric 250 via IOMMU 240. In this regard, data processor 200 may either support a unified memory architecture in which CPU core complex 210 and graphics core 220 share the same memory space, or a memory architecture in which CPU core complex 210 and graphics core 220 share a portion of the memory space, while graphics core 220 may also use a private graphics memory not accessible by CPU core complex 210. Optionally, other processor types may be bi-directionally connected to SMN 215 and to IOMMU 240 for providing memory access requests to data fabric 250 via IOMMU 240. For example, other processor types may include a field programmable gate array (FPGA), a digital signal processor (DSP), as well as special purpose accelerators.

Display engines 230 render and rasterize objects generated by graphics core 220 for display on a monitor. Graphics core 220 and display engines 230 are bi-directionally connected to a common IOMMU 240 for uniform translation into appropriate addresses in memory system 120, and IOMMU 240 is bi-directionally connected to data fabric 250 for generating such memory accesses and receiving read data returned from the memory system.

IOMMU 240 is a memory management unit that connects a memory access capable input/output bus to the main memory. IOMMU 240 receives the address translation requests for memory accesses from SIMD instructions that are executed by graphics core 220.

Data fabric 250 can include a switch, such as a crossbar switch, for routing memory access requests and memory responses between any memory accessing agent and memory controllers 290. It also includes a system memory map, defined by BIOS, for determining destinations of memory accesses based on the system configuration, as well as buffers for each virtual connection.

Peripheral controllers 262 may include a USB controller and a SATA interface controller These two controllers are merely exemplary of peripheral controllers that may be used in data processor 200. Peripheral controllers 262 are bi-directionally connected to I/O hub 276.

Peripheral bus controllers 270 may include a system controller or "Southbridge" (SB) and a PCIe controller. Peripheral bus controllers 270 are bi-directionally connected to I/O hub 276. I/O hub 276 is also bi-directionally connected to data fabric 250.

SMU 280 is a local controller that controls the operation of the resources on data processor 200 and synchronizes communication among them. SMU 280 manages power-up sequencing of the various processors on data processor 200 and controls multiple off-chip devices via reset, enable and other signals. SMU 280 includes one or more clock sources not shown in FIG. 2, such as a phase locked loop (PLL), to provide clock signals for each of the components of data processor 200. SMU 280 also manages power for the various processors and other functional blocks, and may receive measured power consumption values from CPU cores 212 and 214 and graphics core 220 to determine appropriate power states.

Figure 3:
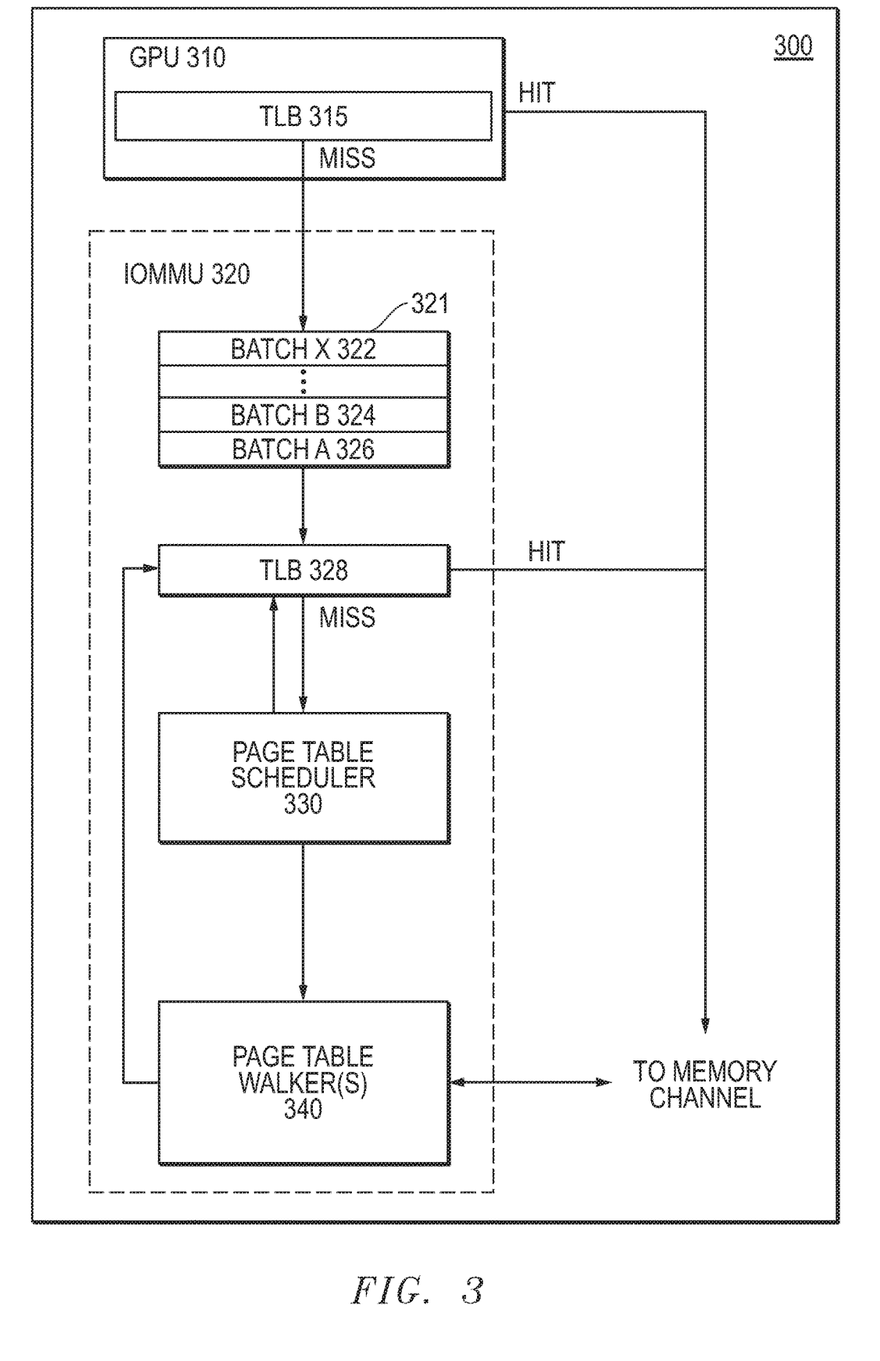
FIG. 3 illustrates in block diagram form a graphic processing unit (GPU) and an associated input output memory management unit (IOMMU) for use in the processing unit of FIG. 2 according to some embodiments.

FIG. 3 illustrates in block diagram form a portion of a data processor 300 that includes a graphic processing unit (GPU) 310 and an associated input output memory management unit (IOMMU) 320 for use in data processor 200 of FIG. 2. Data processor 300 generally includes GPU 310 and IOMMU 320.

GPU 310 includes a translation lookaside buffer (TLB) 315, an output for dispatching a successful address translation (hit) which goes to the memory channel, and an output for an address translation request (miss) that goes IOMMU 320.

IOMMU 320 includes memory request queue 321, TLB 328, page table scheduler 330, and page table walker 340.

Memory request queue 321 includes an input for receiving the address translation request, and an output for distributing the request to TLB 328. Memory request queue 321 also stores groups of address translation request called batches, for example, batch A 326, batch B 324, and batch X 322, where each batch is formed from address translation requests from the same SIMD instruction. Memory request queue 321 sequentially receives and stores each batch of address translation requests from GPU 310.

TLB 328 includes an input for receiving address translation requests, an output for distributing successful address translations to the memory channel, and an input for receiving physical address translations. TLB 328 receives translation requests and is checked for corresponding physical address translations. In the event of a translation request being successfully stored in TLB 328 the corresponding physical address is sent to the memory channel.

Page table scheduler 330 includes an input for receiving address translation requests that miss in TLB 328, and an output for selectively distributing scheduled page table walks to page table walker 340. Page table scheduler 330 receives address translation requests that miss at TLB 328. The address translations that miss at TLB 328 require a page table walk to determine the corresponding physical address for memory access. Page table scheduler 330 reorders the page table walk requests such that an order of dispatching the page table walk request to page table walker 340 is based on a priority determination. Page table scheduler 330 identifies the number of page table accesses (or number of memory requests) that are needed to service all page table walk requests from a given batch of table walk requests from the same SIMD instruction. Page table scheduler 330 selectively prioritizes each batch according to the number of memory accesses needed to translate each virtual address to a physical address associated with the batch. In one embodiment, page table scheduler 330 distributes the batch of address translation requests that has the fewest number of page table accesses to page table walker 340. In another embodiment, page table scheduler distributes the batch of address translation requests based on the fewest number of page table accesses to page table walker 340 and the age of the request. Page table scheduler 330 allows more efficient processing of SIMD instructions.

Page table walkers 340 include an input for receiving a page table walk request, an output that is bi-directionally connected to the memory channel for distributing page table walk requests to the memory channel and for receiving physical address translations from the memory channel in which each page table walk step relates to a portion of the virtual address. Additionally, page table walker 340 has an output for distributing the physical address translation to TLB 328.

Typically, the page table walks are dispatched using a first-come-first-serve protocol, using a first in first out (FIFO) queue. One problem is that the SIMD instructions can only be retired when all the memory requests done by their work items are satisfied, because this constraint is part of the current SIMD-execution model. Another problem is that some of the requests may hit in the earlier levels of the TLB and others may need to go all the way to the IOMMU page table walker. In another scenario, an adjacent batch may be requiring a subset of the same pages, but this information is essentially lost in the layers of TLBs (through a miss status handling register (MSHR) list) and never gets to the page table walker, i.e., the page table walker is not aware of how many batches are waiting for a specific page/request to be translated. In each of these examples, the entire memory system can be overloaded while the address translation for one batch is processed.

Therefore, to decrease strain on the memory system for address translations, IOMMU 320 reorders the address translation requests, and selectively dispatches each page table walk request. In operation, IOMMU 320 receives address translation requests for memory accesses from SIMD instructions executed on a GPU, such as GPU 310 or graphics core 220 of FIG. 2. IOMMU 320 may include a TLB hierarchy, such as TLB 328, that stores recent physical address translations. When the address translation is stored in TLB 328, the physical address is sent to the memory channel. When the address translation misses at TLB 328, the address translation requests that missed in TLB 328 are distributed, as a batch, to page table scheduler 330. Page table scheduler 330 determines the number of unique address translation requests associated with each batch. Instead of distributing each batch of address translation requests to page table walkers 340 in a first come first serve sequence, page table scheduler 330 identifies, from among the batches of memory requests stored in memory request queue 321, a later batch that has a lower number of unique address translation requests than an earlier batch. For example, page table scheduler 330 selectively schedules access to page table walkers 340 for each address translation request of a batch, and selectively chooses the batch that has the lowest number of translation requests to distribute to the page table walker. Page table scheduler 330 monitors inputs to TLB 328 and identifies an SIMD instruction identification that is associated with each batch. The SIMD instruction identification provides the number of memory requests in the batch and the number of unique translation requests that are associated with the batch. Page table scheduler 330 selectively schedules each batch to complete prior to selecting a subsequent batch to send to the page table walker. Completion of each batch includes at least distribution of all unique address translation requests from the batch to a page table walker. Subsequent to each address translation request of a single batch successfully reaching a page table, page table scheduler 330 distributes a next batch to page table walker 340.

In one embodiment, page table scheduler 330 receives a divergent batch and a non-divergent batch. Each batch is composed of a number of address translation requests, or work items. Each SIMD instruction has the potential to issue several concurrent memory requests, up to the number of work items in the batch. The divergent batch includes irregular workloads, or address translation requests with poor data locality. The divergent batch, for example, includes work items that each require an address translation located at a different operating system (OS) page. Therefore a few divergent batches can overload the entire memory system just to handle address translations. A non-divergent batch has more convenient page locality. The non-divergent batch, for example, may include work items that require address translation located at just two OS pages. Accordingly, page table scheduler 330 determines the number of memory requests needed for the divergent batch and the non-divergent batch. In response to the divergent batch requiring a lower number of memory access requests, page table scheduler 330 selectively schedules a divergent batch earlier than a non-divergent batch to access page table walker 340, when the divergent batch has the lower number of memory access requests.

In another embodiment, page table scheduler 330 schedules all address translations for the same SIMD instruction to a page table walker prior to scheduling a batch of address translations from another SIMD instruction. For example, page table scheduler 330 monitors TLB 328 for a subsequent address translation request that is associated with a SIMD instruction being processed by a page table walker. In response to receiving the subsequent address translation request that is associated with the SIMD instruction being processed by the page table walker 340, page table scheduler 330 schedules access to the page table walker 340 for the subsequent address translation request. In response to the address translation request having a resolved physical address translation in TLB 328, then a page table walk is avoided. Further, page table scheduler 330 may dispatch address translation requests associated with the subsequent address translation request to page table walker 340 at an earlier time than a batch received at TLB 328 that has a lower number of memory access requests. Page table scheduler 330 schedules all translation requests associated with a common SIMD instruction to complete together to minimize address translations delays for subsequent batches entering IOMMU 320.

In still another embodiment, page table scheduler 330 monitors a total time period each batch from among batches of memory requests within memory request queue 321 is in IOMMU 320. In response to an older batch pending translation service for greater than a predetermined time period, page table scheduler 330 selectively schedules the older batch access to page table walker 340 at a time earlier than a batch having a lower number of memory access requests.

Figure 4:
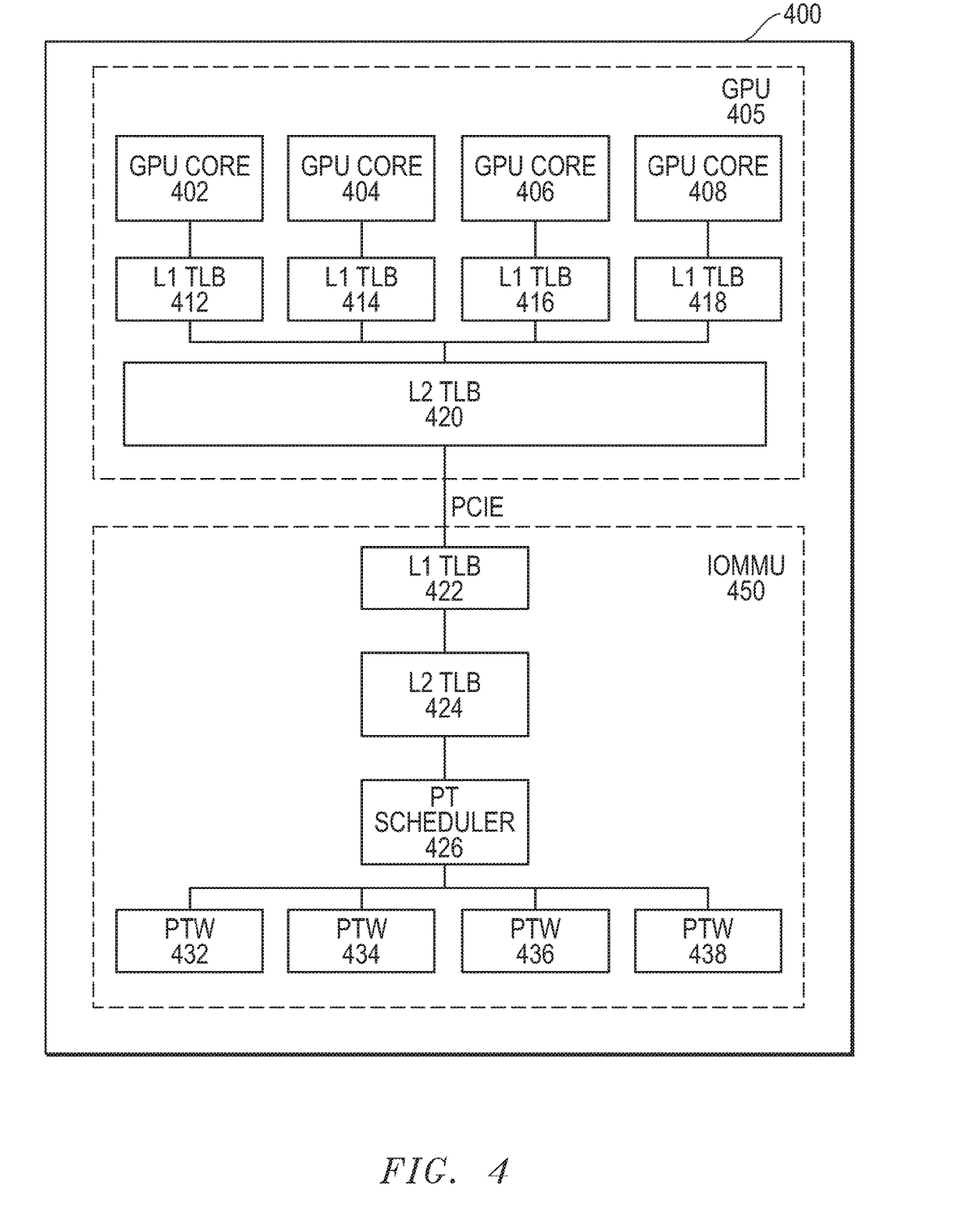
FIG. 4 illustrates in block diagram form a GPU and an IOMMU with an associated page table scheduler for use in the processing unit of FIG. 2 according to some embodiments.

FIG. 4 illustrates a data processing system hierarchy 400. Data processing system hierarchy 400 includes GPU 405 and IOMMU 450.

GPU 450 includes GPU cores 402, 404, 406, and 408. GPU 450 has a unified, shared address space with a CPU core complex. Additionally, GPU 405 includes L1 TLB 412, 414, 416, and 418, and L2 TLB 420. SIMD instructions are executed by GPU cores 402, 404, 406, and 408. GPU 405 has an address translation hierarchy that receives the address translation requests. Successful address translations within GPU 405 at L1 TLB, 412, 414, 416, 418 or L2 TLB 420 go to the memory channel. Otherwise, address translation requests which do not hit in the TLB hierarchy of GPU 405 are distributed to IOMMU 450.

IOMMU 450 includes L1 TLB 422, L2 TLB 424, page table scheduler 426, and page table walker (PTW) 432, 434, 436, and 438. IOMMU 450 receives the address translation requests for memory accesses from SIMD instruction being executed on GPU 405.

In operation, SIMD instructions are executed on GPU 405 by GPU core 402, 404, 406, and 408. Address mappings associated with the SIMD instruction are distributed to L1 TLB 412, 414, 416, and/or 418. When an address translation is not being resolved at L1 TLB 412, 414, 416, and/or 418 the address translation requests are distributed to L2 TLB 420. In response to the address translation request not being resolved at the L2 TLB 420, the address translation requests are distributed as a batch, where address translation requests from a same SIMD instruction form a batch. An address translation miss at L1 TLB 422 and L2 TLB 424 requires a page table walk to resolve the address translation request. L2 TLB 424 receives the batches of memory requests that require a page table walk to complete the address translation. Page table scheduler 426, connected to L2 TLB 424, identifies, from among the batches of memory requests, a later batch that has a lower number of memory access requests than an earlier batch. Page table scheduler 426 selectively schedules access to a page table walker selected from among page table walker 432, 434, 436, and 438. Page table scheduler 426 distributes each address translation request associated with the selected batch to an available page table walker prior to distributing the next selected batch to a page table walker.

In one embodiment, page table scheduler 426 identifies how many different OS pages are requested by each SIMD instruction (load/store instruction). In one example, a batch can request up to 64 different memory addresses from 64 different OS pages. The number of requested memory addresses and corresponding OS pages is associated with a SIMD instruction identification of the batch that accompanies the batch through the memory hierarchy. When the batch reaches page table scheduler 426, the page table scheduler is aware of the number of requested memory addresses and can determine whether the batch is a divergent or a non-divergent batch. Subsequent requests for the same address translation will not be distributed to page table scheduler 426; instead, subsequent requests are added to a miss-status holding register list in the upper levels of the memory hierarchy. The SIMD instruction identification is used by page table scheduler 426 to prioritize each request waiting in L2 TLB 424 (or an associated queue) with the same SIMD instruction identification.

Figure 5:
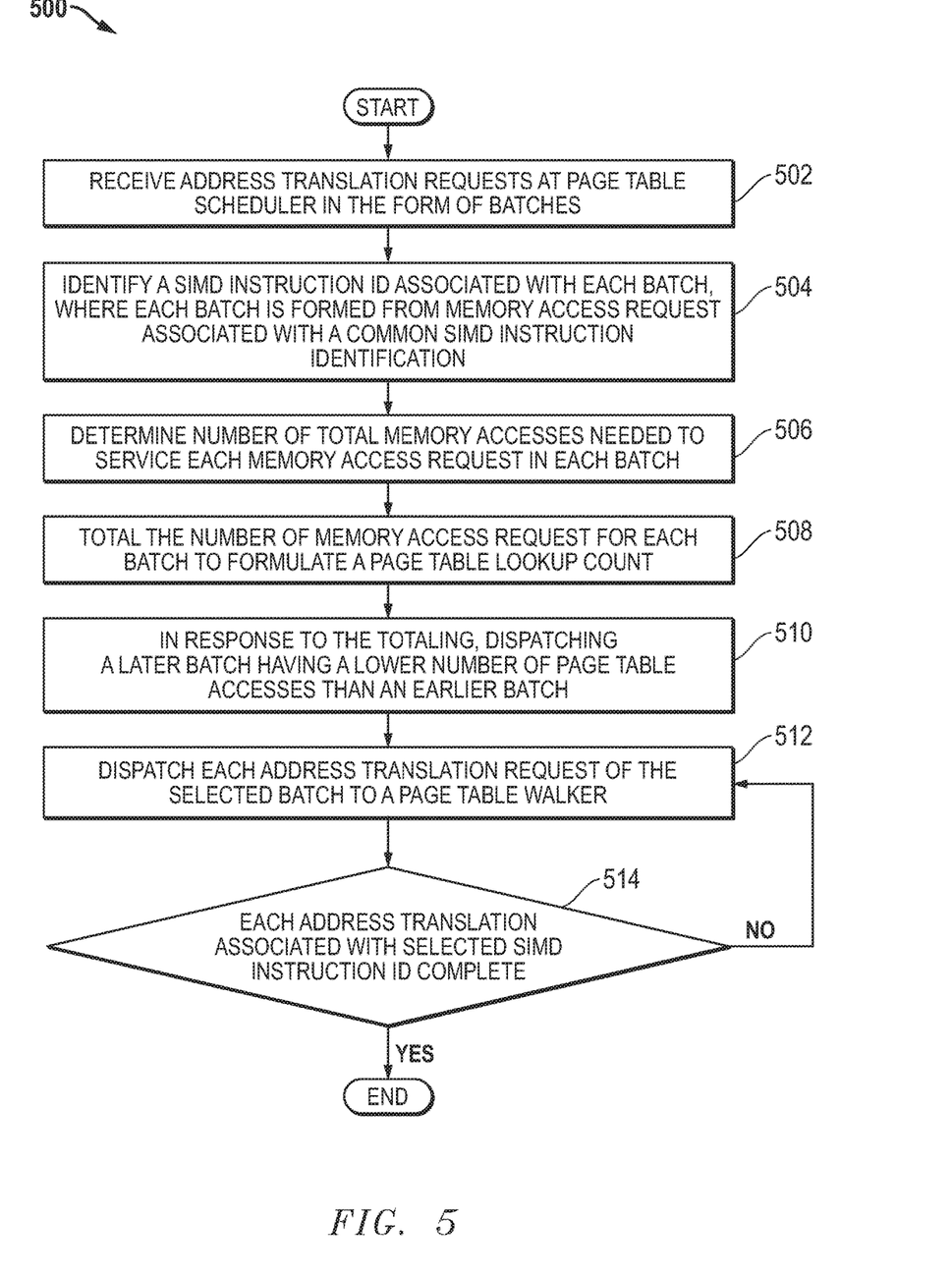
FIG. 5 illustrates a flow diagram for scheduling of memory access requests at the IOMMU that may be used by the page table scheduler of FIG. 3 in some embodiments.

FIG. 5 illustrates a flow diagram method for scheduling memory access requests at the IOMMU that may be used by the page table scheduler of FIG. 3. Method 500 begins at the start block. At block 502, page table scheduler 330 receives address translation requests in the form of batches. Page table scheduler 330 identifies a SIMD instruction identification associated with each batch, where each batch is formed from a memory access request associated with a common SIMD instruction identification at block 504. At block 506, page table scheduler 330 determines the number of total memory accesses needed to service each memory access request in each batch. Page table scheduler 330 totals the number of memory access requests for each batch to formulate a page table lookup count at block 508. At block 510, in response to the totaling, a queue within IOMMU 450, for example memory request queue 321, dispatches a later batch having a lower number of page table accesses than an earlier batch. In a preferred embodiment, the batch having the lowest number of page table accesses is dispatched prior to an earlier batch. Page table scheduler 330 dispatches each address translation request of the selected batch to a page table walker at block 512. At block 514, a determination is made whether each address translation associated with the selected SIMD instruction identification is complete. In response to each address translation associated with the selected SIMD instruction identification not being complete, the process returns to block 512. In response to each address translation request associated with the SIMD instruction identification being complete, the process ends.

Some or all of the methods illustrated in FIG. 5 may be governed by instructions that are stored in a computer readable storage medium and that are executed by at least one processor. Each of the operations shown in FIG. 5 may correspond to instructions stored in a non-transitory computer memory or computer readable storage medium. In various embodiments, the non-transitory computer readable storage medium includes a magnetic or optical disk storage device, solid-state storage devices such as Flash memory, or other non-volatile memory device or devices. The computer readable instructions stored on the non-transitory computer readable storage medium may be in source code, assembly language code, object code, or other instruction format that is interpreted and/or executable by one or more processors.

Although the present invention has been described with reference to preferred embodiments, workers skilled in the art will recognize that changes may be made in form and detail without departing from the scope of the invention.

What is claimed is:

1. An input output memory management unit (IOMMU), comprising:
   a page table scheduler for:
      receiving page table walk requests for an address translation for memory accesses; and
      reordering the page table walk requests such that an order of dispatching the page table walk requests is based on a priority determination, wherein the page table walk requests are from a batch of memory requests that are generated in response to execution of a same single instruction multiple data (SIMD) instruction; and
   a page table walker for receiving, from the page table scheduler, the page table walk requests and walking page tables associated with the page table walk requests in response to the ordering, wherein the page table walker and the page table scheduler are implemented using circuitry.

2. The input output memory management unit of claim 1, wherein the page table walker is further for determining the number of memory accesses anticipated for translating a virtual address, generated from a same SIMD instruction, to a physical address.

3. The input output memory management unit of claim 2, wherein the page table walker is further for dispatching a later address translation requests, from the same SIMD instruction, to the page table walker in response to anticipating the address translation will require a less number of memory accesses than an earlier address translation requests from another SIMD instruction.

4. The input output memory management unit of claim 1, wherein the page table scheduler is further for:
   in response to determining whether an earlier address translation request is waiting in the IOMMU for greater than a predetermined length of time, dispatching the earlier address translation request to the page table walker.

5. The input output memory management unit of claim 1, wherein the page table scheduler is further for assigning each address translation request a corresponding SIMD instruction identification, wherein the corresponding SIMD instruction identification identifies which SIMD instruction generated a corresponding address translation request.

6. The input output memory management unit of claim 1, wherein the page table walker is further for:
   selectively accessing a memory to translate a virtual address of each address translation request of the batch of memory requests to a corresponding physical address; and
   returning the corresponding physical address to a translation lookaside buffer.

7. The input output memory management unit of claim 1, wherein the page table scheduler is further for receiving each address translation requests from the SIMD instruction being executed on a graphics processing unit.

8. A data processing system, comprising:
   a memory;
   an input output memory management unit coupled to the memory and adapted to receive batches of address translation requests, wherein the input output memory management unit has instructions that:
      identifies, from among the batches of address translation requests, a later batch having a lower number of memory access requests than an earlier batch; and
      selectively schedules access to a page table walker for each address translation request of an identified batch.

9. The data processing system of claim 8, wherein the input output memory management unit selectively schedules each identified batch to complete prior to selecting a subsequent batch to the page table walker, wherein each identified batch is a group of address translation requests from a same single instruction multiple data (SIMD) instruction.

10. The data processing system of claim 8, wherein the input output memory management unit selectively schedules a divergent batch earlier than a non-divergent batch when the input output memory management unit determines that the divergent batch requires a lower number of memory access requests, wherein the divergent batch is associated with a batch of address translation requests from a same SIMD instruction that has less orderly data locality than the non-divergent batch in the memory.

11. The data processing system of claim 10, wherein the input output memory management unit selectively schedules the non-divergent batch earlier than the divergent batch when the non-divergent batch has the lower number of memory access requests.

12. The data processing system of claim 8, wherein the input output memory management unit associates a page table walk lookup count with each identified batch, wherein the page table walk lookup count corresponds, at least in part, to a number of memory access requests associated with each identified batch.

13. The data processing system of claim 8, wherein the input output memory management unit monitors a translation lookaside buffer for a subsequent address translation request that is associated with an identified batch being processed by a page table scheduler.

14. The data processing system of claim 13, wherein the input output memory management unit schedules access to the page table walker for the subsequent address translation request, in response to receiving the subsequent address translation request that is associated with the identified batch being processed by the page table scheduler.

15. The data processing system of claim 14, wherein the input output memory management unit dispatches address translation requests associated with the subsequent address translation request, to the page table walker at an earlier time than the identified batch received at the input output memory management unit having a lower number of memory access requests.

16. The data processing system of claim 8, wherein the input output memory management unit:
   monitors a total time period each batch from among the batches of address translation requests is in the input output memory management unit; and
   in response to an older batch pending translation service for greater than a predetermined time period, selectively schedules the older batch access to the page table walker at a time earlier than a batch having a lower number memory access requests.

17. A method for scheduling address translations for a batch of address translation requests, comprising:
   receiving a page table walk request for the batch of address translation requests at an input output memory management unit, wherein the batch of address translation requests is a selection of address translation requests generated by execution of a same single instruction multiple data (SIMD) instruction;
   identifying a SIMD instruction identification that is associated with the batch of address translation requests;

determining a total number of memory accesses needed to service the batch of address translation requests;

totaling the total number of memory accesses per batch of address translation requests to formulate a page table lookup count for each batch; and in response to the totaling, dispatching a later batch of address translation requests having a lower number of page table accesses than an earlier batch of address translation requests.

18. The method of claim 17, further comprising dispatching address translation requests from the batch of address translation requests to an available page table walker from among a number of page table walkers.

19. The method of claim 18, wherein in response to an older batch of address translation requests waiting in the input output memory management unit for a period of time that is greater than a predetermined time, dispatching the older batch of address translation requests to the available page table walker.

20. The method of claim 17, further comprising:

in response to determining whether a subsequent batch of address translation requests is associated with a batch currently being serviced by a page table walker, dispatching the subsequent batch of address translation requests to the page table walker; and determining when each address translation request of the batch currently being serviced is serviced before dispatching another batch of address translation requests.

\* \* \* \* \*